(12) United States Patent
Cohen

(10) Patent No.: US 10,318,523 B2
(45) Date of Patent: Jun. 11, 2019

(54) APPARATUS AND METHOD FOR ALIGNING TOKEN SEQUENCES WITH BLOCK PERMUTATIONS

(71) Applicant: The Johns Hopkins University, Baltimore, MD (US)

(72) Inventor: Jonathan D. Cohen, Glenwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 902 days.

(21) Appl. No.: 14/614,431

(22) Filed: Feb. 5, 2015

(65) Prior Publication Data

US 2015/0220593 A1    Aug. 6, 2015

Related U.S. Application Data

(60) Provisional application No. 61/936,369, filed on Feb. 6, 2014.

(51) Int. Cl.
*G06F 16/24* (2019.01)
*G06F 16/22* (2019.01)
*G06F 21/56* (2013.01)

(52) U.S. Cl.
CPC .......... *G06F 16/24* (2019.01); *G06F 16/2255* (2019.01); *G06F 21/562* (2013.01); *G06F 21/566* (2013.01)

(58) Field of Classification Search
CPC ...... G06F 21/562; G06F 21/566; G06F 16/24; G06F 16/2255
See application file for complete search history.

(56) References Cited

U.S. PATENT DOCUMENTS

| 5,701,256 A | 12/1997 | Marr et al. |
| 5,706,365 A | 1/1998 | Rangarajan et al. |
| 7,644,076 B1 | 1/2010 | Ramesh et al. |
| 7,660,819 B1 * | 2/2010 | Frieder ............ G06F 17/30687 |
| | | 707/999.107 |

(Continued)

OTHER PUBLICATIONS

Cohen, Jonathan D., "Recursive Hashing Functions for n-Grams," ACM Transactions on Information Systems, vol. 15, No. 3, Jul. 1997, pp. 291-320.

*Primary Examiner* — Robert W Beausoliel, Jr.
*Assistant Examiner* — Susan F Rayyan
(74) *Attorney, Agent, or Firm* — Sung T. Kim

(57) ABSTRACT

A method of determining matching between at least a first sample comprising a sequence of tokens A and a second sample comprising a sequence of tokens B may include, for monotonically decreasing values of n, performing operations including recording a subset SA of n-grams of A in a hash table LA, such that a value of each n-gram determines an index in LA and a location of each respective n-gram in A is recorded as the value in LA, recording a subset SB of n-grams of B in a hash table LB, such that a value of each n-gram determines an index in LB and a location of each respective n-gram in B is recorded as the value in LB, for each location L that is occupied in both LA and LB, examining a region in A centered on LA(L) and a region in B centered on LB(L), and reporting a largest matching region aligning LA(L) with LB(L) that does not include already-matched tokens in A or B and marking the largest matching region as matched.

14 Claims, 13 Drawing Sheets

(56) References Cited

U.S. PATENT DOCUMENTS

| | | |
|---|---|---|
| 7,831,392 B2 | 11/2010 | Antoniotti et al. |
| 8,280,640 B2 | 1/2012 | Levin et al. |
| 9,483,740 B1 * | 11/2016 | Ansel .................. G06N 99/005 |
| 9,516,089 B1 * | 12/2016 | Ansel ...................... H04L 67/02 |
| 2003/0175722 A1 | 9/2003 | Mann et al. |
| 2011/0257889 A1 | 10/2011 | Klammer et al. |
| 2012/0151040 A1 * | 6/2012 | Mouravyov ........ H04L 41/0856 |
| | | 709/224 |
| 2014/0082006 A1 * | 3/2014 | Knight .............. G06F 17/30628 |
| | | 707/758 |

* cited by examiner

```
void match( int posA, int posB )
{
        int regionStart = posA;
        int regionEnd   = posB;
        int delta = posB - posA;

//     go backwards
        int loc1 = posA;
        int loc2 = posB;

while ( ( loc1 >= 0 ) && ( loc2 >=0 ) &&
            ( A[ loc1 ] == B[ loc2 ] ) &&
            ( PAB[ loc1 ] < 0 ) && ( PBA[ loc2 ] < 0 ) )
                {
                        regionStart = loc1;
                        loc1--;
                        loc2--;
                }

//     go forwards
        loc1 = posA + 1;
        loc2 = posB + 1;

while ( ( loc1 < A.length ) && ( loc2 < B.length ) &&
            ( A[ loc1 ] == B[ loc2 ] ) &&
            ( PAB[ loc1 ] < 0 ) && ( PBA[ loc2 ] < 0 ) )
                {
                        regionEnd = loc1;
                        loc1++;
                        loc2++;
                }

//     leave if too small
        if ( ( 1 + regionEnd - regionStart ) < m ) return;

//     record match region
        for ( int i = regionStart; i <= regionEnd; i++ )
        {
                PAB[ i ] = i + delta;
                PBA[ i + delta ] = i;
        }
}
```

FIG. 6.

| m | α | c | λ | σ | q | Time (sec.) |
|---|---|---|---|---|---|---|
| 10 | 0.5 | 1 | 39552 | 79829 | 0.12110510344444927 | 0.254 |
| 10 | 0.5 | 16 | 39552 | 79835 | 0.12110511703123338 | 0.235 |
| 10 | 0.5 | 128 | 39552 | 79835 | 0.12110511703123338 | 0.237 |
| 10 | 0.5 | ~ | 39552 | 79836 | 0.12110511788548953 | 0.377 |
| 10 | 0.7 | 1 | 39552 | 79880 | 0.12110510429874885 | 0.362 |
| 10 | 0.7 | 16 | 39552 | 79885 | 0.12110517414435887 | 0.341 |
| 10 | 0.7 | 128 | 39552 | 79885 | 0.12110517414435887 | 0.332 |
| 10 | 0.7 | ~ | 39552 | 79886 | 0.12110517499861502 | 0.514 |
| 10 | 0.9 | 1 | 39552 | 79846 | 0.12110505483324985 | 0.837 |
| 10 | 0.9 | 16 | 39552 | 79919 | 0.12110519993475884 | 0.777 |
| 10 | 0.9 | 128 | 39552 | 79919 | 0.12110519993475884 | 0.751 |
| 10 | 0.9 | ~ | 39552 | 79907 | 0.12110519391428693 | 1.117 |
| 10 | 0.95 | 1 | 39552 | 79845 | 0.12110505334677413 | 1.476 |
| 10 | 0.95 | 16 | 39552 | 79891 | 0.12110518952096959 | 1.408 |
| 10 | 0.95 | 128 | 39552 | 79891 | 0.12110518952096959 | 1.352 |
| 10 | 0.95 | ~ | 39552 | 79910 | 0.12110519680346863 | 2.027 |
| 100 | 0.5 | 1 | 39552 | 77138 | 0.12110374928577865 | 0.227 |
| 100 | 0.5 | 16 | 39552 | 77138 | 0.12110374928577865 | 0.219 |
| 100 | 0.5 | 128 | 39552 | 77138 | 0.12110374928577865 | 0.217 |
| 100 | 0.5 | ~ | 39552 | 77138 | 0.12110374928577865 | 0.279 |
| 100 | 0.7 | 1 | 39552 | 77138 | 0.12110374928577865 | 0.332 |
| 100 | 0.7 | 16 | 39552 | 77138 | 0.12110374928577865 | 0.288 |
| 100 | 0.7 | 128 | 39552 | 77138 | 0.12110374928577865 | 0.298 |
| 100 | 0.7 | ~ | 39552 | 77138 | 0.12110374928577865 | 0.377 |
| 100 | 0.9 | 1 | 39552 | 77138 | 0.12110374928577865 | 0.707 |
| 100 | 0.9 | 16 | 39552 | 77138 | 0.12110374928577865 | 0.635 |
| 100 | 0.9 | 128 | 39552 | 77138 | 0.12110374928577865 | 0.626 |
| 100 | 0.9 | ~ | 39552 | 77138 | 0.12110374928577865 | 0.698 |
| 100 | 0.95 | 1 | 39552 | 77138 | 0.12110374928577865 | 1.295 |
| 100 | 0.95 | 16 | 39552 | 77138 | 0.12110374928577865 | 1.165 |
| 100 | 0.95 | 128 | 39552 | 77138 | 0.12110374928577865 | 1.123 |
| 100 | 0.95 | ~ | 39552 | 77138 | 0.12110374928577865 | 1.493 |

| $m$ | $\alpha$ | $c$ | $\lambda$ | $\sigma$ | $q$ | Time (sec.) |
|---|---|---|---|---|---|---|
| 10 | 0.5 | 1 | 1541412 | 4915140 | 0.05737904754944398S | 15.628 |
| 10 | 0.5 | 16 | 1541412 | 5133308 | 0.0573793724838G251 | 18.731 |
| 10 | 0.5 | 128 | 1541412 | 5133585 | 0.0573793819871723S | 24.672 |
| 10 | 0.5 | ~ | 1541412 | 5131723 | 0.0573793935G843043 | 35.564 |
| 10 | 0.7 | 1 | 1541412 | 4925764 | 0.0573791304960353S | 21.418 |
| 10 | 0.7 | 16 | 1541412 | 5158663 | 0.05737938G51923493 | 2G.772 |
| 10 | 0.7 | 128 | 1541412 | 5159471 | 0.05737941194970944 | 37.334 |
| 10 | 0.7 | ~ | 1541412 | 5167445 | 0.05737940944G520646 | 51.269 |
| 10 | 0.9 | 1 | 1541412 | 4934570 | 0.05737921421454631 | 49.45 |
| 10 | 0.9 | 16 | 1541412 | 5155703 | 0.05737942187581112S | 65.568 |
| 10 | 0.9 | 128 | 1541412 | 5156146 | 0.0573794305186G4174 | 99.508 |
| 10 | 0.9 | ~ | 1541412 | 5159893 | 0.05737942798738659 | 131.775 |
| 10 | 0.95 | 1 | 1541412 | 4952301 | 0.05737924526860872 | 90.518 |
| 10 | 0.95 | 16 | 1541412 | 5190706 | 0.05737943910700532 | 128.746 |
| 10 | 0.95 | 128 | 1541412 | 5190719 | 0.05737944393482026 | 187.823 |
| 10 | 0.95 | ~ | 1541412 | 5189540 | 0.05737943992G16482 | 245.765 |
| 100 | 0.5 | 1 | 1541412 | 3523479 | 0.05737658826473107 | 14.251 |
| 100 | 0.5 | 16 | 1541412 | 3528099 | 0.05737877367462G49 | 12.825 |
| 100 | 0.5 | 128 | 1541412 | 3529084 | 0.0573787839987265SS | 12.655 |
| 100 | 0.5 | ~ | 1541412 | 3529078 | 0.05737880G65310617 | 22.343 |
| 100 | 0.7 | 1 | 1541412 | 3524170 | 0.05737869359374316G | 19.005 |
| 100 | 0.7 | 16 | 1541412 | 3529337 | 0.05737880751035167 | 17.733 |
| 100 | 0.7 | 128 | 1541412 | 3529802 | 0.057378805048714944 | 17.394 |
| 100 | 0.7 | ~ | 1541412 | 3529764 | 0.057378812555826476 | 27.284 |
| 100 | 0.9 | 1 | 1541412 | 3523854 | 0.05737869357972023 | 42.617 |
| 100 | 0.9 | 16 | 1541412 | 3529523 | 0.05737878445368327 | 40.242 |
| 100 | 0.9 | 128 | 1541412 | 3529881 | 0.05737880G561723485 | 39.578 |
| 100 | 0.9 | ~ | 1541412 | 3529867 | 0.05737881345304461 | 53.0 |
| 100 | 0.95 | 1 | 1541412 | 3525514 | 0.0573787095G994281 | 78.112 |
| 100 | 0.95 | 16 | 1541412 | 3529746 | 0.057378806048671335 | 72.482 |
| 100 | 0.95 | 128 | 1541412 | 3529824 | 0.0573788130287895 | 71.871 |
| 100 | 0.95 | ~ | 1541412 | 3529824 | 0.0573788130287895 | 92.977 |

FIG. 9.

| m | α | c | λ | σ | q | Time (sec.) |
|---|---|---|---|---|---|---|
| 10 | 0.5 | 1 | 611319 | 2489618 | 0.1335965337223092 | 5.446 |
| 10 | 0.5 | 16 | 611319 | 2520832 | 0.1335989404814582 | 4.799 |
| 10 | 0.5 | 128 | 611319 | 2520925 | 0.1335989893675764 | 4.529 |
| 10 | 0.5 | ~ | 611319 | 2520939 | 0.1335988985715272 | 10.794 |
| 10 | 0.7 | 1 | 611319 | 2508802 | 0.1335987143705559 | 6.762 |
| 10 | 0.7 | 16 | 611319 | 2526351 | 0.1335989074998148 | 5.99 |
| 10 | 0.7 | 128 | 611319 | 2526319 | 0.1335989117229755 | 5.884 |
| 10 | 0.7 | ~ | 611319 | 2526400 | 0.1335989124272051 | 13.246 |
| 10 | 0.9 | 1 | 611319 | 2516139 | 0.1335988385974845 | 15.28 |
| 10 | 0.9 | 16 | 611319 | 2532346 | 0.1335989223355734 | 12.681 |
| 10 | 0.9 | 128 | 611319 | 2532401 | 0.1335989240599644 | 11.186 |
| 10 | 0.9 | ~ | 611319 | 2532344 | 0.1335989240093654 | 28.249 |
| 10 | 0.95 | 1 | 611319 | 2518371 | 0.1335988539483419 | 27.351 |
| 10 | 0.95 | 16 | 611319 | 2532685 | 0.133598906289814 | 21.111 |
| 10 | 0.95 | 128 | 611319 | 2532825 | 0.1335989253156231 | 18.778 |
| 10 | 0.95 | ~ | 611319 | 2532887 | 0.1335989254110875 | 51.026 |
| 100 | 0.5 | 1 | 611319 | 2366790 | 0.1335193664074093 | 5.236 |
| 100 | 0.5 | 16 | 611319 | 2468301 | 0.1335981582710051 | 4.431 |
| 100 | 0.5 | 128 | 611319 | 2479416 | 0.1335986173998778 | 4.158 |
| 100 | 0.5 | ~ | 611319 | 2479416 | 0.1335986173998778 | 8.883 |
| 100 | 0.7 | 1 | 611319 | 2396778 | 0.1335868129064733 | 6.684 |
| 100 | 0.7 | 16 | 611319 | 2479346 | 0.1335986064802342 | 5.716 |
| 100 | 0.7 | 128 | 611319 | 2482615 | 0.1335986817251939 | 5.218 |
| 100 | 0.7 | ~ | 611319 | 2482615 | 0.1335986817352939 | 10.691 |
| 100 | 0.9 | 1 | 611319 | 2404651 | 0.1335885916618066 | 14.509 |
| 100 | 0.9 | 16 | 611319 | 2481398 | 0.1335986580190027 | 11.84 |
| 100 | 0.9 | 128 | 611319 | 2484444 | 0.1335987117356797 | 9.696 |
| 100 | 0.9 | ~ | 611319 | 2484444 | 0.1335987117356797 | 23.851 |
| 100 | 0.95 | 1 | 611319 | 2435169 | 0.1335945758386830 | 26.177 |
| 100 | 0.95 | 16 | 611319 | 2482831 | 0.1335986672336166 | 19.56 |
| 100 | 0.95 | 128 | 611319 | 2485070 | 0.1335987211023774 | 16.303 |
| 100 | 0.95 | ~ | 611319 | 2485070 | 0.1335987211023774 | 41.327 |

FIG. 10.

| Order of Discovery | Length | Position Delta |
|---|---|---|
| 1 | 611319 | -36361 |
| 2 | 222494 | 2916 |
| 3 | 611319 | -72079 |
| 4 | 222494 | -32802 |
| 5 | 165085 | 2923 |
| 6 | 165085 | -32795 |
| 7 | 122463 | 2913 |
| 8 | 122463 | -32805 |
| 9 | 21316 | 2916 |
| 10 | 21316 | -32802 |

| m | α | c | λ | σ | q | Time (sec.) |
|---|---|---|---|---|---|---|
| 10 | 0.5 | 1 | 11 | 51 | 7.076764295205586E-11 | 5.034 |
| 10 | 0.5 | 16 | 11 | 51 | 7.076764295205586E-11 | 5.108 |
| 10 | 0.5 | 128 | 11 | 51 | 7.076764295205586E-11 | 5.067 |
| 10 | 0.5 | ~ | 11 | 51 | 7.076764295205586E-11 | 6.776 |
| 10 | 0.7 | 1 | 11 | 51 | 7.076764295205586E-11 | 7.806 |
| 10 | 0.7 | 16 | 11 | 51 | 7.076764295205586E-11 | 7.842 |
| 10 | 0.7 | 128 | 11 | 51 | 7.076764295205586E-11 | 7.829 |
| 10 | 0.7 | ~ | 11 | 51 | 7.076764295205586E-11 | 9.101 |
| 10 | 0.9 | 1 | 11 | 51 | 7.076764295205586E-11 | 20.009 |
| 10 | 0.9 | 16 | 11 | 62 | 8.720312240925111E-11 | 20.464 |
| 10 | 0.9 | 128 | 11 | 62 | 8.720312240925111E-11 | 19.856 |
| 10 | 0.9 | ~ | 11 | 62 | 8.720312240925111E-11 | 18.995 |
| 10 | 0.95 | 1 | 11 | 51 | 7.076764295205586E-11 | 37.892 |
| 10 | 0.95 | 16 | 11 | 62 | 8.720312240925111E-11 | 38.418 |
| 10 | 0.95 | 128 | 11 | 62 | 8.720312240925111E-11 | 38.09 |
| 10 | 0.95 | ~ | 11 | 62 | 8.720312240925111E-11 | 33.935 |
| 100 | 0.5 | 1 | 0 | 0 | 0.0 | 4.539 |
| 100 | 0.5 | 16 | 0 | 0 | 0.0 | 4.588 |
| 100 | 0.5 | 128 | 0 | 0 | 0.0 | 4.656 |
| 100 | 0.5 | ~ | 0 | 0 | 0.0 | 6.248 |
| 100 | 0.7 | 1 | 0 | 0 | 0.0 | 6.622 |
| 100 | 0.7 | 16 | 0 | 0 | 0.0 | 6.677 |
| 100 | 0.7 | 128 | 0 | 0 | 0.0 | 6.816 |
| 100 | 0.7 | ~ | 0 | 0 | 0.0 | 8.0 |
| 100 | 0.9 | 1 | 0 | 0 | 0.0 | 16.552 |
| 100 | 0.9 | 16 | 0 | 0 | 0.0 | 16.855 |
| 100 | 0.9 | 128 | 0 | 0 | 0.0 | 17.216 |
| 100 | 0.9 | ~ | 0 | 0 | 0.0 | 16.445 |
| 100 | 0.95 | 1 | 0 | 0 | 0.0 | 31.255 |
| 100 | 0.95 | 16 | 0 | 0 | 0.0 | 31.923 |
| 100 | 0.95 | 128 | 0 | 0 | 0.0 | 32.736 |
| 100 | 0.95 | ~ | 0 | 0 | 0.0 | 29.046 |

FIG. 12.

| Minimum Size m | α | Elapsed Time For Given Number of Filtering Points (seconds) | | | |
|---|---|---|---|---|---|
| | | 0 | 1 | 2 | 3 |
| 10 | 0.5 | 111 | 77 | 44 | 36 |
| | 0.7 | 203 | 131 | 70 | 51 |
| | 0.9 | 631 | 400 | 196 | 132 |
| | 0.95 | 1278 | 796 | 383 | 246 |
| 100 | 0.5 | 96 | 31 | 23 | 22 |
| | 0.7 | 178 | 49 | 32 | 28 |
| | 0.9 | 567 | 134 | 73 | 53 |
| | 0.95 | 1144 | 264 | 146 | 93 |

FIG. 13.

| Minimum Size m | α | c | Elapsed Time For Given Number of Filtering Points (seconds) | | |
|---|---|---|---|---|---|
| | | | 0 | 1 | 2 |
| 10 | 0.5 | 1 | 16 | 15 | 20 |
| | | 16 | 23 | 19 | 22 |
| | | 128 | 33 | 25 | 27 |
| | 0.7 | 1 | 22 | 21 | 26 |
| | | 16 | 34 | 27 | 30 |
| | | 128 | 55 | 37 | 40 |
| | 0.9 | 1 | 56 | 49 | 53 |
| | | 16 | 91 | 66 | 69 |
| | | 128 | 160 | 100 | 101 |
| | 0.95 | 1 | 105 | 91 | 94 |
| | | 16 | 170 | 121 | 123 |
| | | 128 | 307 | 188 | 187 |
| 100 | 0.5 | 1 | 16 | 14 | 19 |
| | | 16 | 14 | 13 | 17 |
| | | 128 | 19 | 13 | 16 |
| | 0.7 | 1 | 21 | 19 | 23 |
| | | 16 | 20 | 18 | 22 |
| | | 128 | 34 | 17 | 21 |
| | 0.9 | 1 | 49 | 43 | 47 |
| | | 16 | 51 | 40 | 44 |
| | | 128 | 97 | 40 | 44 |
| | 0.95 | 1 | 95 | 78 | 82 |
| | | 16 | 94 | 72 | 78 |
| | | 128 | 185 | 72 | 78 |

FIG. 14.

| m | α | c | λ | σ | q | Time (sec.) |
|---|---|---|---|---|---|---|
| 10 | 0.7 | 128 | 1541412 | 5159471 | 0.05737941194970944 | 38.351 |
| 100 | 0.7 | 128 | 1541412 | 3529802 | 0.05737880584871494 | 17.917 |
| 1000 | 0.7 | 128 | 1541412 | 3253936 | 0.05737604984289068 | 15.688 |
| 10000 | 0.7 | 128 | 1541412 | 2696438 | 0.0573210959872118 | 13.912 |
| 100000 | 0.7 | 128 | 1541412 | 1915669 | 0.05643605701138311 | 11.403 |
| 1000000 | 0.7 | 128 | 1541412 | 1541412 | 0.05534559959895867 | 8.81 |

FIG. 15.

APPARATUS AND METHOD FOR ALIGNING TOKEN SEQUENCES WITH BLOCK PERMUTATIONS

CROSS-REFERENCE TO RELATED APPLICATIONS

This application claims the benefit of U.S. Provisional Application No. 61/936,369 filed on Feb. 6, 2014, the entire contents of each which are hereby incorporated herein by reference.

TECHNICAL FIELD

Example embodiments generally relate to analysis techniques for determining similarity and, in particular, relate to providing an efficient way of achieving good alignment between two sequences that have matching sections that may be out of order.

BACKGROUND

The easy and routine distribution of computer code in source and binary form, and the importance of those distributions, has engendered strongly-felt needs to identify code theft, code provenance, and the presence of malware. Each of these needs may be met, at least in part, by the ability to rapidly compare test code samples to a large library of reference code samples to detect reference samples similar to the test samples. In particular, there is a strong desire to recognize when incoming code binaries are variants of known examples of malware.

The most promising approaches to recognizing code similarity typically do so by transforming the code samples into streams of tokens. These tokens can represent source characters, words, functional names, op-codes, calls, or other features or can represent parallel features in code binaries. For example, some methods produce token streams of characters, similar to DNA streams, drawn from sections of code binaries. Other methods of code similarity detection may be based on token streams of op-codes. Still other methods operate based on streams of tokens drawn from source code, in which structural elements are reduced to single-letter tokens. Some solutions may describe methods based on tokens representing calls to system routines during runtime.

Concurrently, the internet has offered an explosion of text documents leading to a strongly-felt need to recognize similar passages of text for the purposes of detecting plagiarism in academic environments, establishing provenance, and reducing duplication. The most successful approaches to bulk detection of document similarity have also been based on converting document samples to token streams, with those tokens representing words or characters in the documents.

Despite the strongly-felt needs and considerable work in this area, conventional methods generally do not offer methods that achieve a processing speed and library capacity that can address the anticipated need for rapid bulk processing of input samples against a voluminous library of references. Moreover, conventional methods do not efficiently deal with finding matches that may be out of order in respective different sequences.

Accordingly, it may be desirable to continue to develop improved and/or more efficient mechanisms by which alignment between token sequences with block permutations may be provided.

BRIEF SUMMARY OF SOME EXAMPLES

Accordingly, some example embodiments may enable the provision of a relatively efficient solution for addressing the issues described above. In one example embodiment, an apparatus for alignment of token sequences with block permutations is provided. The apparatus may include processing circuitry configured to execute instructions for determining matching between at least a first sample comprising a sequence of tokens A and a second sample comprising a sequence of tokens B, the instructions causing when executed, for monotonically decreasing values of n, performance of operations including recording a subset SA of n-grams of A in a hash table LA, such that a value of each n-gram determines an index in LA and a location of each respective n-gram in A is recorded as the value in LA, recording a subset SB of n-grams of B in a hash table LB, such that a value of each n-gram determines an index in LB and a location of each respective n-gram in B is recorded as the value in LB, for each location L that is occupied in both LA and LB, examining a region in A centered on LA(L) and a region in B centered on LB(L), and reporting a largest matching region aligning LA(L) with LB(L) that does not include already-matched tokens in A or B and marking the largest matching region as matched.

In another example embodiment, a method of determining matching between at least a first sample comprising a sequence of tokens A and a second sample comprising a sequence of tokens B is provided. The method may include, for monotonically decreasing values of n, performing operations including recording a subset SA of n-grams of A in a hash table LA, such that a value of each n-gram determines an index in LA and a location of each respective n-gram in A is recorded as the value in LA, recording a subset SB of n-grams of B in a hash table LB, such that a value of each n-gram determines an index in LB and a location of each respective n-gram in B is recorded as the value in LB, for each location L that is occupied in both LA and LB, examining a region in A centered on LA(L) and a region in B centered on LB(L), and reporting a largest matching region aligning LA(L) with LB(L) that does not include already-matched tokens in A or B and marking the largest matching region as matched.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 illustrates a table for execution of a method in accordance with an example embodiment;

FIG. 8 illustrates a table showing results for matching two sequences according to an example embodiment;

FIG. 9 illustrates a table showing results for matching two sequences according to an example embodiment;

FIG. 10 illustrates a table showing results for matching two sequences according to an example embodiment;

FIG. 11 illustrates a table showing a first ten matches in relation to matching two sequences according to an example embodiment;

FIG. 12 illustrates a table showing results for matching two sequences according to an example embodiment;

FIG. 13 illustrates a chart of elapsed time for a given number of filtering points according to an example embodiment;

FIG. 14 illustrates a chart of elapsed time for a given number of filtering points according to an example embodiment;

FIG. 15 illustrates a table showing results for matching two sequences with different minimum match sizes according to an example embodiment.

DETAILED DESCRIPTION

Figure 1:
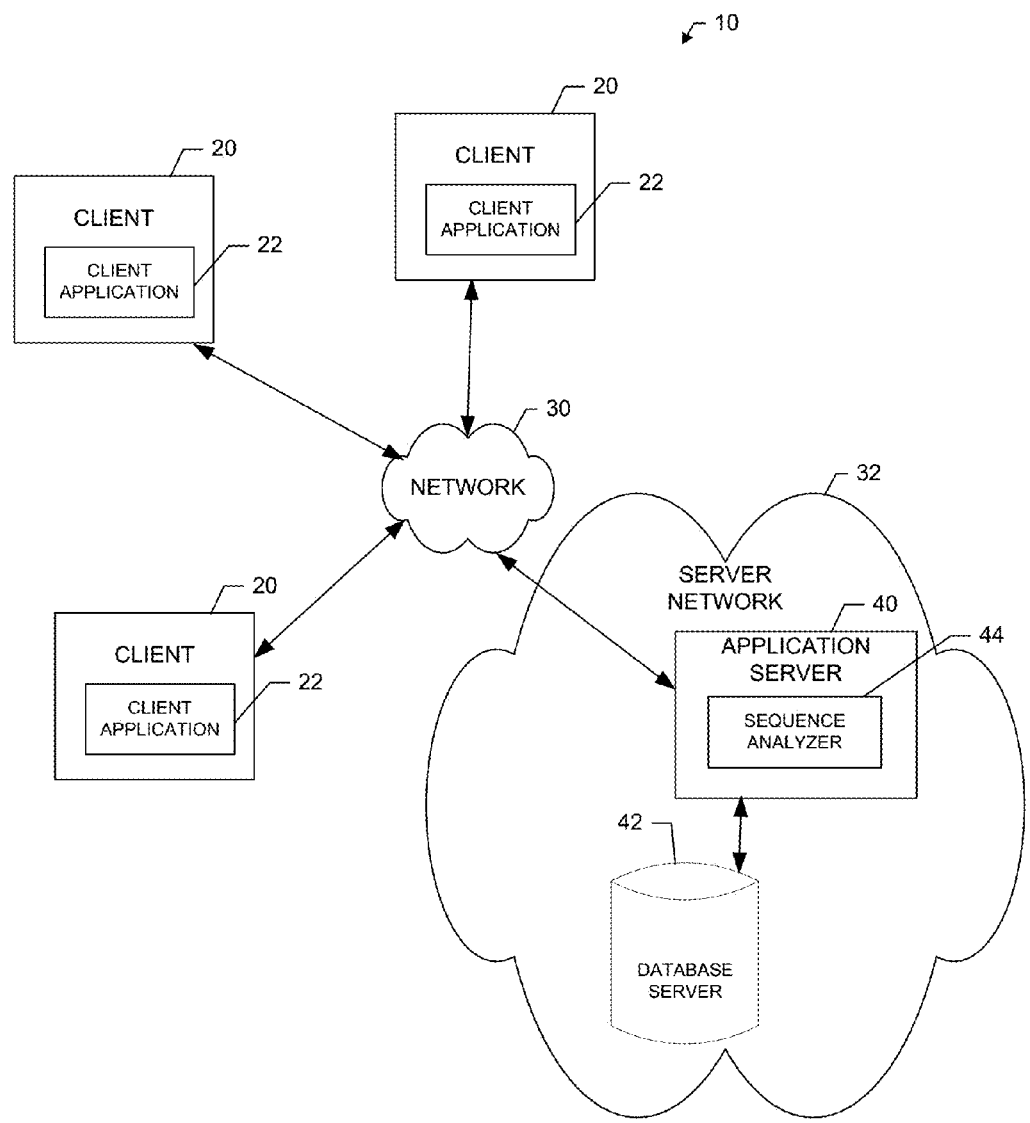
FIG. 1 illustrates a functional block diagram of a system that may be useful in connection with alignment between token sequences with block permutations according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

In some examples, each sample or sequence is converted to a token stream, from which n-grams may be extracted. A library of sequences may be stored at some location and a sequence from the library may be compared to one or more other sequences from the library or otherwise being analyzed in accordance with an example embodiment. Responsive to the comparison performed, an identification of sections within each sequence that are matched may be generated. Moreover, example embodiments may be configured to identify multiple sections that match. Example embodiments may be configured to handle permuted matches (e.g., sections of one sequence that are in a different order that respective matching sections in another sequence). Example embodiments may be designed to be one-to-one in that any section in the first sequence that is matched will be matched to only one corresponding section of the other sequence. In an example embodiment, the configuration may also favor larger matches. Thus, for example, if a subsection of the first sequence is matched to a corresponding subsection of the other sequence, but a larger section of the first sequence that includes the subsection is matched to a corresponding larger section of the other sequence, then the larger section would be favored and consequently matched. Example embodiments are also designed to be efficient, requiring $O(N)$ space and $O(N\log N)$ time, where N is the combined length of A and B if A is the first sequence and B is the other sequence.

An n-gram is an n-long sequence of consecutive tokens drawn from a stream of tokens. Representing a token stream by its constituent n-grams makes a uniform basis of comparison of token streams, provides tolerance of small differences between token streams, and offers rapid computation. One can also easily represent n-grams by their numeric hash values, thereby saving space and providing a numeric index or key into tables for recording and look-up purposes. Accordingly, one can construct signatures of token streams using n-gram hash values, rather than using n-grams directly.

Some example embodiments of the present invention may provide a heuristic method of aligning two sequences of tokens in the face of block permutations; that is, the procedure examines the two sequences and attempts to discover all matching segments of a significant length, despite their relative order in the sequences being compared. In terms of the combined length N of the token sequences, the method requires memory size that is $O(N)$ and a processing time that is $O(N \ln N)$, as mentioned above. Some example embodiments may be employed for comparing computer code binaries for provision of malicious software detection, for comparison of text sequences for determining plagiarism, provenance and/or the like, and for performing genomic comparisons. However, it should also be appreciated that example embodiments may further provide utility in connection with identifying similar portions of sequences in any of numerous other environments as well.

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing files as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing and/or analyzing binary code as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of certain sequences of tokens (e.g., binary codes associated with software or content being analyzed, DNA sequences, text sequences, and/or the like). In some cases, these contents may be stored in the database server 42. Alternatively or additionally, the application server 40 may be configured to provide analytical tools for use by the clients 20 in accordance with example embodiments.

In some embodiments, for example, the application server 40 may therefore include an instance of a sequence analyzer 44 comprising stored instructions for handling activities associated with practicing example embodiments as described herein. As such, in some embodiments, the clients 20 may access the sequence analyzer 44 online and utilize the services provided thereby. However, it should be appreciated that in other embodiments, the sequence analyzer 44 may be provided from the application server 40 (e.g., via download over the network 30) to one or more of the clients 20 to enable recipient clients to instantiate an instance of the sequence analyzer 44 for local operation. As yet another example, the sequence analyzer 44 may be instantiated at one or more of the clients 20 responsive to downloading instructions from a removable or transferable memory device carrying instructions for instantiating the sequence analyzer 44 at the corresponding one or more of the clients 20. In such an example, the network 30 may, for example, be a peer-to-peer (P2P) network where one of the clients 20 includes an instance of the sequence analyzer 44 to enable the corresponding one of the clients 20 to act as a server to other clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the sequence analyzer 44 configured to operate in accordance with an example embodiment of the present invention. In this regard, for example, the sequence analyzer 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which analysts may interact with, configure or otherwise maintain the system 10.

As such, the environment of FIG. 1 illustrates an example in which provision of content and information associated with the analysis such as, for example, security or intelligence operations may be accomplished by a particular entity (namely the sequence analyzer 44 residing at the application server 40). However, it should be noted again that the sequence analyzer 44 could alternatively handle provision of content and information within a single organization. Thus, in some embodiments, the sequence analyzer 44 may be embodied at one or more of the clients 20 and, in such an example, the sequence analyzer 44 may be configured to handle provision of content and information associated with analytical tasks that are associated only with the corresponding single organization. Access to the sequence analyzer 44 may therefore be secured as appropriate for the organization involved and credentials of individuals or analysts attempting to utilize the tools provided herein.

Figure 2:
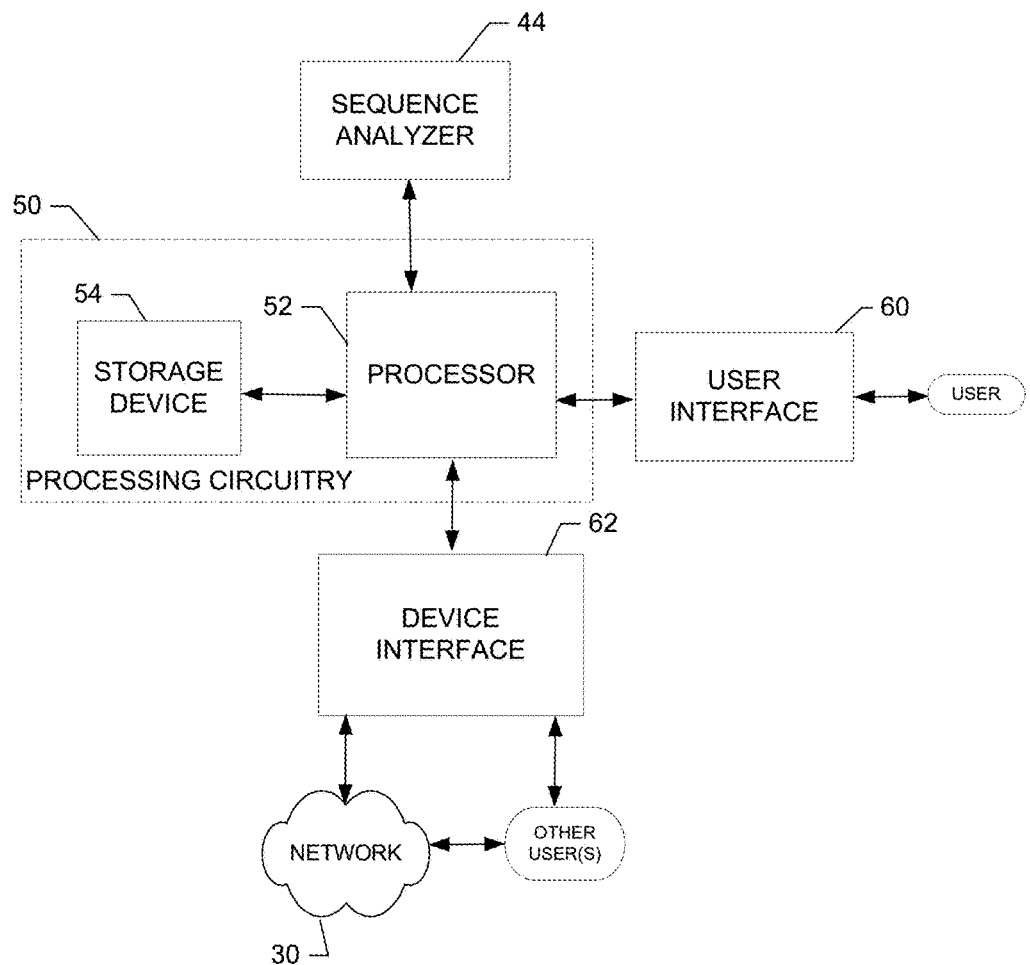
FIG. 2 illustrates a functional block diagram of an apparatus that may be useful in connection with alignment between token sequences with block permutations according to an example embodiment.

An example embodiment of the invention will now be described with reference to FIG. 2. FIG. 2 shows certain elements of an apparatus for provision of alignment between token sequences with block permutations according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus for provision of alignment between token sequences with block permutations is provided. The apparatus may be an embodiment of the sequence analyzer 44 or a device hosting the sequence analyzer 44. As such, configuration of the apparatus as described herein may transform the apparatus into the sequence analyzer 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the sequence analyzer 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the sequence analyzer 44 as described below.

The sequence analyzer 44 manager may include tools to facilitate the creation and distribution of analysis results via the network 30. In an example embodiment, the analysis results may include reports indicating matches identified and/or potential matches that merit further analysis. The reports may be generated on the basis of analytical processing performed by the sequence analyzer 44. In this regard, the sequence analyzer 44 may be configured to process sequences such as text, DNA, binary code or codes that are provided thereto and compare the content to be queried or analyzed to a library of contents so that matches or near matches can be identified. In some embodiments, the comparison may actually be performed on a compressed representation of the code, and the compressed representation of the code such as an n-gram or hashes of n-grams. The comparison performed may identify portions of sequences that correspond to respective other portions of sequences as described herein.

In some embodiments, the sequence analyzer 44 may further include one or more components or modules that may be individually configured to perform one or more of the individual tasks or functions generally attributable to the sequence analyzer 44. However, the sequence analyzer 44 need not necessarily be modular. In cases where the sequence analyzer 44 employs modules, the modules may, for example, be configured to process the sequences to identify n-grams, hash n-grams, perform mapping functions as described herein, compare sequences and/or the like. In some embodiments, the sequence analyzer 44 and/or any modules comprising the sequence analyzer 44 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the sequence analyzer 44 and/or any modules thereof, as described herein.

Figure 3:
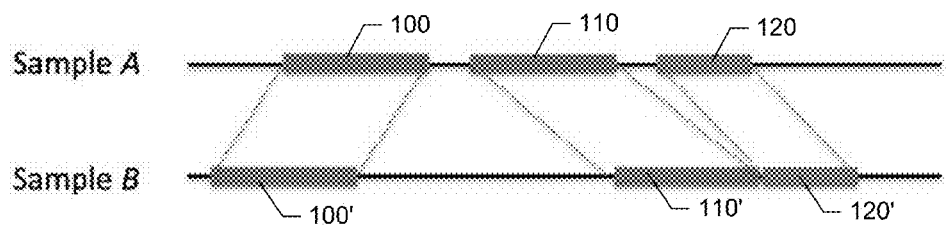
FIG. 3 illustrates lines associated with sample A and sample B that each represent a sequence of tokens in which alignment of token sequences is performed in accordance with an example embodiment.
Figure 4:
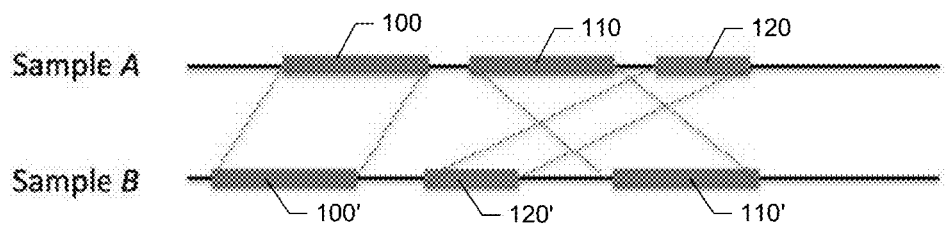
FIG. 4 illustrates lines associated with sample A and sample B that each represent a sequence of tokens in which alignment of token sequences is performed in accordance with an example embodiment.

An example embodiment will now be described in general terms in relation to a determination as to whether two sequences or samples (e.g., sample A and sample B) include similar portions. In FIGS. 3 and 4, the lines associated with sample A and sample B each represent a sequence of tokens. To tokens can each be thought of as a character, though no such restriction is necessary. In practice, samples may be tens to millions of tokens long. Accordingly, by employing the sequence analyzer 44, an investigation of sample A and sample B may be accomplished to determine whether any areas match. In the example of FIG. 3, region one 100 of sample A is matched by a corresponding first matching region 100' in sample B. Region two 110 of sample A is matched by a corresponding second matching region 110' in sample B. Region three 120 of sample A is matched by a corresponding third matching region 120' in sample B.

As can be appreciated from FIG. 3, the highlighted portions that match are not necessarily at matching locations relative to the overall sequences of which they are parts. In this regard, since the remainder portions of each line shown in sample A and sample B are portions that do not substantially match, it can be seen that the non-matching portion between region one 100 and region two 110 is smaller than the non-matching portion between the first matching region 100' and the second matching region 110'. However, it should also be appreciated that, in some cases, the matching portions may not show up in the same order. This is a departure from standard DNA alignment assumptions. Thus, standard methods for determining matching may not be sufficient in all cases (particularly where sequences can occur out of order). FIG. 4 illustrates such an example.

Figure 5:
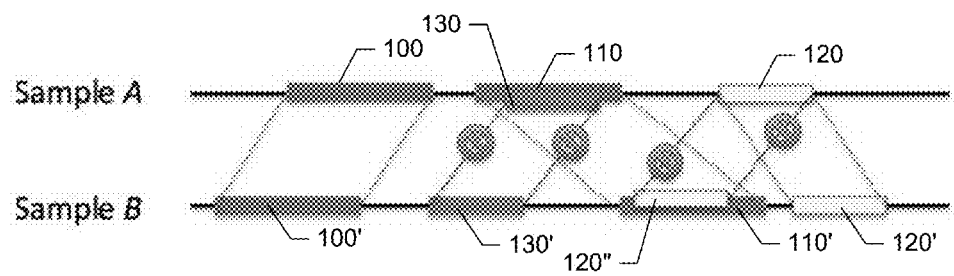
FIG. 5 illustrates lines associated with sample A and sample B that each represent a sequence of tokens in which alignment of token sequences selecting the largest matching segments is performed in accordance with an example embodiment.

In FIG. 4, sample A may be substantially identical to the example of FIG. 3. However, sample B may be slightly different in that the second and third matching regions 110' and 120' occur in a different order. In the example of FIG. 4, sample A and sample B are each comprised of a concatenation of sequences such as A=W|X|Y|Z, and B=X|Z|W|Y, where X corresponds to region one 100 and the first matching region 100', Y corresponds to region two 110 and the second matching region 110', and Z corresponds to region three 120 and the third matching region 120'. Existing genomic algorithms are not designed to deal with block permutations like this. Moreover, such existing genomic algorithms also fail to be "greedy" in terms of searching for matches that are as large as possible. FIG. 5 will be referenced to explain the concept of "greedy" behavior in the context of an example embodiment.

In FIG. 5, region one 100 and the first matching region 100', region two 110 and the second matching region 110', and region three 120 and the third matching region 120' are again shown in relation to their respective locations in sample A and sample B, respectively. In this example, a fourth region 130 is also shown in sample A and the fourth region 130 has a corresponding fourth matching region 130' in sample B. However, since the fourth region 130 is a subset of the second region 110, and a larger matching portion (i.e., the second matching region 110') is located in sample B, the fourth matching region 130' is not recorded as a match. Instead, the larger match of region two 110 and the second matching region 110' is recorded. Additionally, even though there is a duplicate third matching region 120" to the third matching region 120', the duplicate third matching region 120" is also not recorded since it is a subset of the second matching region 110'. Accordingly, in the event that a sequence in one sample occurs in more than one place in the other sample, recordation of a match will only be performed for the sequence associated with the largest block that is found in both, provided that those matches don't encroach on matches of a larger size. As suggested above, there is no requirement that all sections of A match sections of B or that all sections of B match sections of A.

Matching problems as described above are known to be intractable, in the sense that their optimal solution cannot be guaranteed in polynomial time. The approach of example embodiments is heuristic and therefore provides a relatively good estimated solution that can be carried out rapidly, but is not guaranteed to reach the optimum. The goal of the sequence analyzer 44 of example embodiments is also in matching regions of "substantial size." Consider, for example, matching regions of length 1: unless the alphabet of tokens is large relative to the size of the samples, near-complete matching even of random samples would result. More generally, matching tiny regions is not likely to be informative, since those matches will occur at random. The approach taken here is that a minimum region size m is specified as an input parameter (e.g., by an operator). Accordingly, for larger values of m, the solution is actually achievable more quickly. This is, of course, not surprising in light of the explosive number of alignment possibilities for small values of m.

In accordance with an example embodiment, the sequence analyzer may be configured to approach the matching described herein based on hashes of n-grams. The n-grams of sequence $S=(s_1, s_2, s_3, \ldots, s_{|S|})$ are $\{(s_{i-(n-1)}, s_{i-(n-2)}, \ldots, s_i)\}$ for $i=n, n+1, \ldots, |S|$, that is, each is an n-long subsequence and each differs from its predecessor only in the introduction of a new token and loss of an old one. Each n-gram will be characterized by its hash value in such examples. In some example implementations, the hash values may all be 4-byte integers, but this is not required. Representing the n-grams by their hash values may offer many advantages. For example, the hash values may be easily manipulated and stored. Additionally, the length of the hash values is independent of n. Moreover, the work to compute the hash values of the set of n-grams for S is independent of n. This last point may not be obvious: by using recursive hashing, the hash value of each n-gram can be computed from its predecessor by a simple update whose work is asymptotically independent of n. So, counter-intuitively, computing all the million-grams of S takes the same time as computing the bi-grams of S, at least as the length of S goes to infinity. An example will now be described to illustrate a simple algorithm to address the problem outlined above and give results for a related experiment.

Suppose that there is a common subsequence of A and B that is L long. Then for any n≤L, sequences A and B must share at least 1+L−n n-grams of length n, namely, the ones contained in the common subsequence. Conversely, if A and B share an n-long n-gram, then they have a common sequence including (at least) that n-gram. This suggests that looking for shared blocks might by accomplished by looking for common n-grams. The advantage of doing this is that it is easy to find common n-grams, when the common n-grams are each represented by their hash values, through hash tables. A potential slight drawback with this approach is hash collisions. In this regard, for example, it may be possible that distinct n-grams could possess equal hash values.

A relatively simple description of the idea above may be as follows. A design parameter m may be specified as the minimum pattern size to find relative to examination of the samples A and B. Then, as an initial operation, the common m-grams in A and B, and their locations, may be found by operation of the sequence analyzer 44. The sequence analyzer 44 may then examine, for each common m-gram g, the regions terminating at g's locations in A and B for a match, extending that match as far as possible.

However, in some cases, this basic approach may be considered to be too simplistic. For example, this simplistic approach may fail the "greedy assignment" requirement that a sequence may not be used as part of a match if it belongs to a larger match elsewhere. Moreover, there may be a great many locations for some of the n-grams, causing the work to become quadratic. These objections are overcome by the more complete algorithm described below.

In this regard, in order to address the desire for "greedy assignment," work may be conducted by the sequence analyzer 44 in stages. At each stage, a search may be conducted for common n-grams, using the common n-grams to identify matches within portions of A and B that have not yet been used in a match. The first stage may work with large n-grams and each successive stage may work with n-grams smaller than its predecessor. The process will terminate when A or B is exhausted or when the n-gram size would be smaller than m, the specified minimum match size. To keep the work from going quadratic within a stage, attention may be restricted to the first occurrence of each n-gram in A and B.

Before beginning, two maps: $P_{AB}$ and $P_{BA}$ may be defined. The first map will eventually map each position (an integer) in A to its corresponding position (another integer) in B; the second will map positions in B to positions in A. Those positions that do not have a correspondence will map to the value −1. These maps may be implemented as integer arrays whose initial values are all −1. Each stage may proceed as follows:

(1) Two maps $L_A$ and $L_B$, implemented as hash tables mapping integers to integers, may be initialized as empty maps. Keys in each hash table may be n-gram hash values. Values in the tables may be locations (positions) in A or B, respectively; entries not set will effectively have a value of ø. (There is nothing required about using integers for hash values; they are merely convenient and efficient.)

(2) The n-grams in sequence A are hashed, recording the result into location map $L_A$ as follows: as the n-grams are produced, pairs of the form (h,l) are generated, with h being the hash value and l being the location in the sequence that produced it. If $L_A(h)=ø$, then set $L_A(h) \leftarrow l$; otherwise, do nothing. When this step is through, each entry of $L_A$ will map an n-gram hash value to the first location where that n-gram terminates in A.

(3) The n-grams in sequence B are hashed, recording the result into location map $L_B$ in a similar fashion.

(4) For each key h in $L_A$ such that we also have $L_B(h) \not\approx ø$, matches are sought by calling match $(L_A(h),L_B(h))$, a procedure described below that populates $P_{AB}$ and $P_{BA}$. In other words, for each hash value that occurs in both A and B, a match is sought that includes that n-gram at the locations recorded in the location maps.

(5) The maps $P_{AB}$ and $P_{BA}$ serve as the output.

In some cases, an amplification of the procedure match (i,j) may be applied, which looks for a match that includes an alignment of position i in A and position j in B. In such an example the longest match that does not use positions that have already been matched is sought. Recall that matches are recorded in $P_{AB}$ and $P_{BA}$, and that unmatched positions in these maps are indicated by values of −1. The procedure goes backward from the positions i and j for as long as the tokens in A and B match, the positions are not already assigned, and the sequences are not exhausted. Then the procedure goes forward in the same manner. If the resulting match region meets the minimum length of m, it is reported by filling in $P_{AB}$ and $P_{BA}$. This process is described in detail in the table 200 shown in FIG. 6. The order of extending the match in the forward and backward directions is immaterial.

In implementing operation (4) above, one might be reacting, in part, to collisions, in which distinct n-grams hash to the same value. Depending upon how flat the hash function is for the particular alphabet of tokens, this may lead to slightly diminished performance in some cases. To guard against this, one can use a second, independent hasher, populating two arrays $V_A$ and $V_B$, such that an n-gram hash value of h at position i in A records h in position i of $V_A$ and an n-gram hash value of h at position i in B records h in position i of $V_B$. Now, when a key h in $L_A$ is such that $L_A(h) \not\approx ø$ and $L_B(h) \not\approx ø$, a check that $V_A[L_A(h)]=V_B[L_B(h)]$ may also be made before calling match. The test takes $O(1)$ time, populating the extra maps doubles the time for those steps. As such, the work needed for one stage is $O(N)$, with $N=|A|+|B|$.

The schedule of n-gram size choices for the stages will now be described in accordance with an example embodiment. In some cases, the size may start out at $\min\{|A|, |B|\}$ and be decremented by one for each stage until the minimum size of m is reached. Doing so would tend to generate a greedy assignment, but the work would be $O[N^2]$. Accordingly, as an alternative, the following heuristic may be employed. The initial n-gram size may be chosen to be some large fraction of $\min\{|A|, |B|\}$. Then the size $n_i$ for each subsequent stage i may be chosen as equal to $n_i=an_{i-1}$, until it would fall below m, then pick size m for one more stage. The value a, chosen to be less than 1, may be another algorithm parameter. With this approach, approximately $1+\log_{1/a}\{\min\{|A|, |B|\}/m\}$ stages may be needed. In general, for this exponential n-gram size schedule, Work=$O$(NlogN). This asymptotic expression hides the coefficient that scales in proportion to $\log(1/a)$. Note that since these work values are asymptotic, their scaling behavior may not be observed, in light of setup times and other constant-work components.

With respect to operations (2) and (3) above, only the first occurrence of each hash value may be recorded, in the unlikely event that there are multiple occurrences of n-grams contained in matches that are not recognized by the first occurrences of other n-grams, they will be picked up in the next stage. In some cases, although not required, the last stage may be repeated until no further matches are obtained. Finally, the maps $P_{AB}$ and $P_{BA}$ constitute an alignment in which $P_{AB}$ illustrates how to align sample B to sample A, and $P_{BA}$ illustrates how to align sample A to sample B.

Operations (2) and (3) above need not record hash-location pairs for locations that have already been assigned to a match in $P_{AB}$ and $P_{BA}$. Accordingly, these operations may consult $P_{AB}$ and $P_{BA}$ while the corresponding work of these operations is performed, choosing to ignore hash inputs for locations already assigned. This process may provide a guaranteed speed improvement with no down side and, in the case of duplicate n-grams, moving latter unmatched locations to the first position and available for matching.

Suppose that a position in sample A is the terminus of an n-gram not found in sample B. Then it may be considered to be guaranteed that no larger n-gram terminating at this position will be present in B, either. So at the outset (before any of the stages), all the hashes of m-long n-grams that are common to both samples may be found and the locations in sample A and in sample B where n-grams that are not common to both terminate can be marked. Then, in all stages, operations (2) and (3) may be made to ignore these infeasible positions. While there is some expense in locating these infeasible positions (linear with the combined sample lengths), this can save substantial time in the stages, particularly when there is little matching between the samples.

This idea can also be applied to different points in the process. For example, suppose that some intermediate stage I will have an n-gram size of $n_I$. Common $n_I$-gram hashes may first be located and then the hashes may be used to find infeasible locations for all stages up to, and including, stage I. Then another intermediate stage after I may be chosen and the process may be repeated until eventually filtering on common n-grams at size m for the last set of stages. An advantage of doing this may be that there are likely to be fewer (or even no) common n-grams of the larger sizes, so that the earlier stages will be accelerated.

If early stages find matches, significant portions of the samples have been matched and are unavailable for matching later. As described above, the algorithm still goes through the length of both samples generating n-gram hashes. There may be a minor amount of overhead in examining just pieces of the samples, but when enough of the samples become matched it becomes cost effective to only process the unmatched stretches. This incurs no added possibility of missing something.

In the early stages of the algorithm, n-grams that are many orders of magnitude larger than m may be encountered. Accordingly, it seems unlikely that examining every single n-gram at such a time is necessary. As such, it may be sufficient to look at a portion of the n-grams, perhaps as a fraction of the n-gram size. For some experiments, any n-gram hash value divisible by $$d = 1 + 2\left\lfloor \frac{n/c}{2} \right\rfloor,$$

where c is a coverage factor parameter and n is the current n-gram size, were chosen. Essentially, this "decimation" results in acceptance of, on average, c positions per n-gram length. Forcing the decimation d to be odd (though not required) may result in avoidance of biases that might be present in the hash function. To implement the mechanism described above, operations (2) and (3) above may test n-gram hashes and reject those that are not divisible by d. For the last stage (using n-grams with size m), no decimation may be done.

Figure 7:
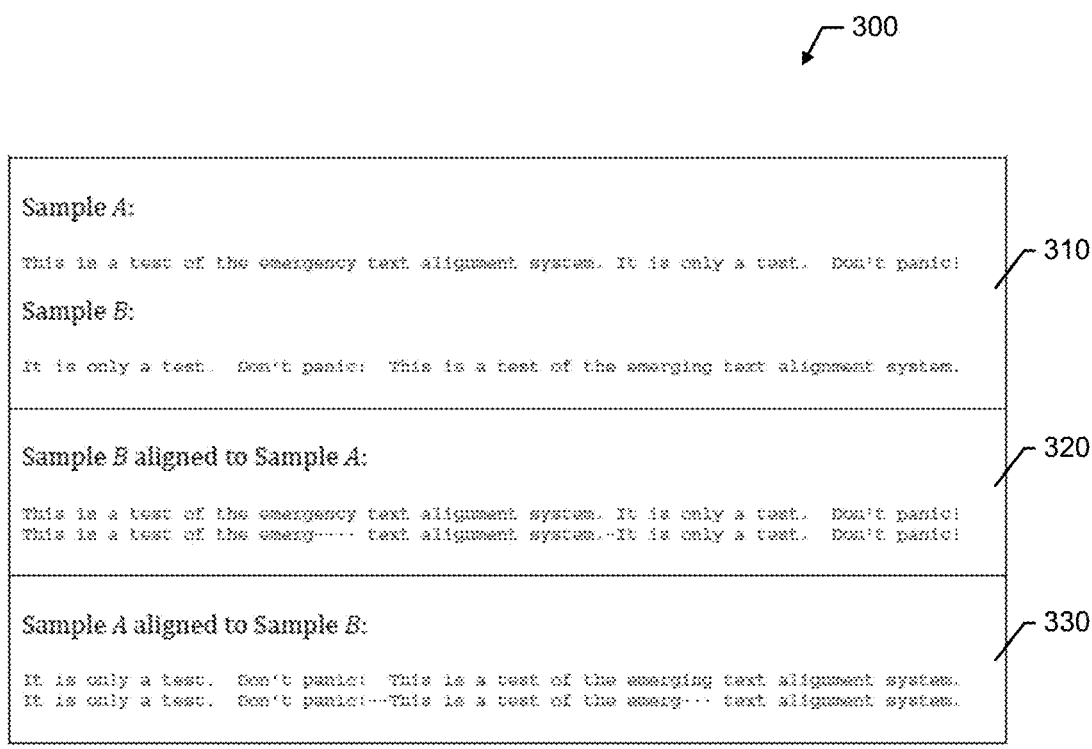
FIG. 7 illustrates an example of aligning two text samples in accordance with an example embodiment.

Table 300, shown in FIG. 7, illustrates an example of aligning two text samples. In table 300, each character is a token. The two samples largely contain the same information, but permuted in blocks. They also differ in that one has the word "emergency" and the other "emerging," which share a subsequence. Block 310 illustrates each of sample A and sample B in their entirety. Block 320 shows sample B aligned to sample A, meaning that sample A is presented in its entirety and in sequence, and the corresponding symbols of sample B (given by $P_{AB}$) have been written immediately below the symbols of sample A. Where there is no correspondence, a dash appears. Finally, in block 330, sample A has been aligned to sample B, again showing dashes where there is no correspondence.

To evaluate the algorithm, consideration may be given to three measures of matching quality, and elapsed time. Not surprisingly, the matching quality measures are based on the matched regions in the samples. Let the such matched subsequence have a length of $\lambda_i$.

Longest sequence: $\Lambda = \max_i \lambda_i$

Sum of sequences: $\sigma = \Sigma \lambda_i$

Normalized quadratic sum: $q = \Sigma(\lambda_i/l)^2$, where $l = \min(|A|, |B|)$.

Note that $\sigma/l \leq 1$ is the fraction of matched positions. The measure q rewards longer sequences over shorter ones for a fixed $\sigma$. Elapsed time was also measured. Table 400, illustrated in FIG. 8, shows the results for two sequences of size near 150 k, in which there is something close to a 50% overlap.

For the example of table 400, the matching measures showed relatively little sensitivity to the parameters a and c. Increasing c always improved the quality of the match if any change occurred at all, except in one instance of going to the infinite case. (See bolded rows.) One might consider it odd at first that, for n=10, going from $\alpha=0.9$ to $\alpha=0.95$ actually resulted in a uniform decrease in matching performance. However, this result should not be shocking since the heuristic approach is sensitive to many things, such as to the order in which hash values are examined in step (4). With m=100, nothing made a difference in matching. All settings found the same longest subsequence. Not surprisingly, a larger value of m took a bit less time, but had fewer matches, indicating that some of the matching areas are less than 100 long. Note also that the set of parameters examined produced a range of elapsed times that differed by a factor of about 9.

The results of a more challenging test are given in table 500, which is shown in FIG. 9. In the example of FIG. 9, two samples of about 6.5 M were tested, here with an overlap of about three quarters. In table 500, it is apparent that in many instances, the undecimated case, which should be more careful, actually lowered a and/or q, relative to the corresponding c=128 case. Again, this is likely due more to the vagaries of the order of visiting hash values than anything else. For the most part, increasing a produced improvement, though not uniformly.

A fact illuminated in table 500 that may be considered to be surprising is that increasing c actually decreased the time for n=100, because early removal of match areas excluded them from examination later. For the set of parameters examined, the elapsed times varied over a factor of about 17.

Results from another pair are presented in table 600, which is illustrated in FIG. 10. This pair of samples of about 2.5 M tokens each is remarkable because nearly every big pattern occurred twice in both samples. Also, the samples, when aligned properly, match almost completely. Table 700, illustrated in FIG. 11, shows the first 10 matches discovered.

Table 800, illustrated in FIG. 12, shows an example of large samples with very little in common. Removing infeasible positions from consideration meant that almost the entire time was spent in building the n-gram hashers before anything else was done. If the same processor was to be applied to many pairs, those processors could be reused without preparation after the first pair.

Not surprisingly, the undecimated cases, indicated by a~in tables 400, 500, 600 and 800, took the most time, since they looked at all (feasible) n-grams at each stage. The numbers that appear in all the tables above for the undecimated cases reflect locating infeasible locations at 3 points in the stages, spaced equally. That is, the first third of the stages benefited from testing for feasible locations based on the smallest n-gram size in those stages, the next third of the stages benefited from testing for feasible locations based on the smallest n-gram size in those middle stages, and the last third of the stages benefited from testing for feasible locations based on the smallest n-gram size m.

Table 900, illustrated in FIG. 13, shows how elapsed time dropped markedly as a result of testing for feasible locations for undecimated computation, sometimes improving by a factor of more than 10. The first column of times, headed by "0", indicates the result of no testing for feasibility. The second column, headed by "1", shows the result of testing before all stages with an n-gram size of m. The other columns also included testing at intermediate steps. Ultimately, use of 3 points of testing was chosen for undecimated computation, and 1 point was chosen for decimated settings. Clearly, filtering at three points is a good idea, and this was done in constructing the results of tables 400 through 800.

Table 1000, shown in FIG. 14, is similar, showing the changes in time due to different filtering of infeasible locations for the decimating cases. Separate columns show results for no filtering, filtering only at one point, namely at outset before any stages, and for two points in the process. Clearly, filtering once is a good idea, and this was done in constructing the results of tables 400 through 800.

Table 1100, shown in FIG. 15, examines the effect of minimum n-gram size for fixed parameters $\alpha=0.8$ and c=128. These tests were on the data that formed table 500. As can be appreciated from the tables, it pays (in speed) to only ask the minimum size that one wants.

One can see that the heuristic approach will not necessarily reach the optimum matching; but then, it is not clear what "optimum" is. As measured by the scores $\sigma$ and q, for the most part better alignments were obtained by increasing a or c, at the expense of computation time. But improvements in alignment were often tiny, while attendant time increases could be substantial. For the examples here, the use of decimation would appear to be well suited and, in many cases, advantageous. (The rows that do not use decimation in the tables are indicated with a~.) Avoiding decimation can result a significant cost in processing time while not offering significant improvements in alignment.

It would seem (for this set of data and tested parameters) that good performance may be achieved with selection of somewhere around c=128. Also, it seems that a good choice for a is someplace in the range [0.7, 0.9], which also covers a factor of 2 in time, that is, the choice of $\alpha=0.9$ takes roughly 2 times as much execution time as does the choice $\alpha=0.7$. Ultimately, the choice of parameters will depend upon the relative importance of computation time and of eking out the last bit of alignment. Further work on data representative of the specific application is warranted.

In some examples in testing scenarios, it has been determined that only scanning the areas that had not been matched almost always offered improvement in speed (without altering matching)—sometimes markedly so. In cases where most of the samples become matched in early stages, the savings could be substantial. Consequently, seeking n-grams only in unmatched areas of the input samples is often a good choice.

The schedules for n-gram sizes of each stage and for decimation are worth further examination. The n-gram schedule chosen here was an obvious one that covered a wide range of sizes while keeping the time from exploding too rapidly. But one could envision adaptive schedules that concentrated finer granularity about n-grams commensurate with match region sizes and were more sparse elsewhere. Or global ones that changed more quickly or less quickly on either end of the range. Similarly, decimations could offer different concentrations on either end of the n-gram size spectrum or locally, as demanded by measurements taken on the data at being processed.

Figure 16:
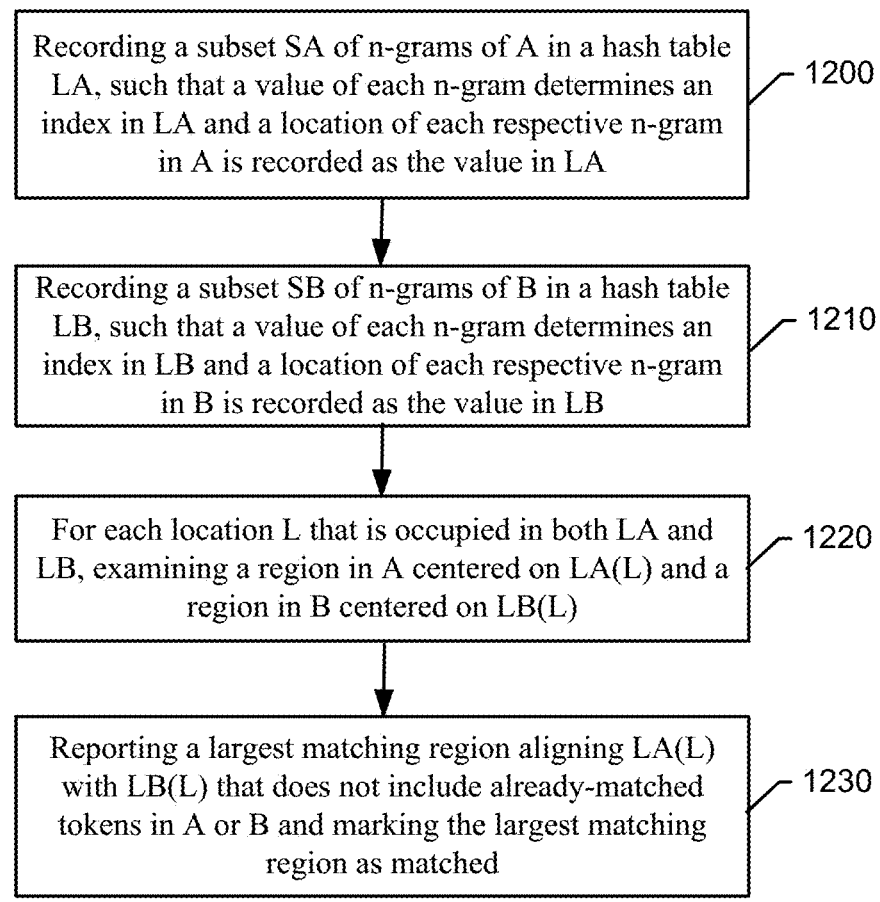
FIG. 16 illustrates a method of achieving alignment between token sequences with block permutations according to an example embodiment.

From a technical perspective, the sequence analyzer 44 described above may be used to support some or all of the operations described above. As such, the platform described in FIG. 2 may be used to facilitate the implementation of several computer program and/or network communication based interactions. As an example, FIG. 16 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention is shown in FIG. 16. The method may be employed for determining matching between at least a first sample comprising a sequence of tokens A and a second sample comprising a sequence of tokens B. The method may include, for monotonically decreasing values of n, performing operations including recording a subset SA of n-grams of A in a hash table LA, such that a value of each n-gram determines an index in LA and a location of each respective n-gram in A is recorded as the value in LA at operation 1200. The method may further include recording a subset SB of n-grams of B in a hash table LB, such that a value of each n-gram determines an index in LB and a location of each respective n-gram in B is recorded as the value in LB at operation 1210. The method may also include, for each location L that is occupied in both LA and LB, examining a region in A centered on LA(L) and a region in B centered on LB(L) at operation 1220 and reporting a largest matching region aligning LA(L) with LB(L) that does not include already-matched tokens in A or B and marking the largest matching region as matched at operation 1230.

In an example embodiment, an apparatus for performing the method of FIG. 16 above may comprise a processor (e.g., the processor 52) or processing circuitry configured to perform some or each of the operations (1200-1230) described above. The processor may, for example, be configured to perform the operations (1200-1230) by performing hardware implemented logical functions, executing stored instructions, or executing algorithms for performing each of the operations. In some embodiments, the processor or processing circuitry may be further configured for additional operations or optional modifications to operations 1200 to 1230. In this regard, for example, the method may further include specializing monotonically decreasing values of n to exponential decay. In some examples, each n-gram is hashed and each resulting hash value determines a corresponding location in LA and LB. In some examples, the subsets of SA and SB may be determined by hash values of n-grams meeting a defined criterion. In some cases, n-grams already matched or infeasible are skipped. In an example embodiment, a minimum match size may be specified by an operator, and reporting the largest matching region may include reporting the largest matching region having at least the minimum match size.

In some cases, the method could be modified slightly so that some of the steps could be concurrent. For example, in a first step, recording a subset SA of n-grams of A in a hash table LA may be accomplished such that a value of each n-gram determines an index in LA and a location of each respective n-gram in A is recorded as the value in LA. Then, hashing n-grams of B may be accomplished. A determination may then be made as to whether to keep each hashed n-gram of B. For each hashed n-gram being kept, a potential storage location L in a table may be determined. However, instead of storing in the table, a determination may be made as to whether potential storage location L is occupied in LA and, if occupied, a determination may then be made as to whether a match exists.

It is understood by those skilled in the art that the operations enumerated in the example embodiments may be implemented by any combination of software, firmware, and hardware suited to the application, design constraints, and design figures of merit and that steps may, in many cases, be combined, divided, or reordered, all without deviating from the spirit of this disclosure. Example embodiments may therefore be enabled to perform alignments of sequences in the face of block permutations. Such alignments may be performed in NlogN time, where N is the combined length of sequences A and B. Example embodiments may also perform alignments in space linear with the combined length of the sequences.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for identifying code similarities utilizing processing circuitry by determining matching between codes in the form of at least a first sample comprising a sequence of tokens A and a second sample comprising a sequence of tokens B, the method comprising, for monotonically decreasing values of n, performing operations including:

recording, by the processing circuitry, a subset SA of n-grams of A in a hash table LA, such that a value of each n-gram determines an index in LA and a location of each respective n-gram in A is recorded as the value in LA;

recording, by the processing circuitry, a subset SB of n-grams of B in a hash table LB, such that a value of each n-gram determines an index in LB and a location of each respective n-gram in B is recorded as the value in LB;

for each location L that is occupied in both LA and LB, examining, by the processing circuitry, a region in A centered on LA(L) and a region in B centered on LB(L), wherein the examining is performed successively in stages with the region in A centered on LA(L) and the region in B centered on LB(L) being reduced in size in each successive stage until a largest matching region aligning LA(L) with LB(L) in A or B is found or a size of the regions is reduced beyond a minimum size; and reporting, by the processing circuitry, the largest matching region and marking the largest matching region as matched or reporting that the minimum size has been reached.

2. The method of claim 1, further comprising specializing monotonically decreasing values of n to exponential decay.

3. The method of claim 1, wherein each n-gram is hashed and each resulting hash value determines a corresponding location in LA and LB.

4. The method of claim 3, wherein the subsets of SA and SB are determined by hash values of n-grams meeting a defined criterion.

5. The method of claim 4, wherein n-grams already matched or infeasible are skipped.

6. The method of claim 1, wherein the minimum match size is specified by an operator.

7. The method of claim 1, further comprising eliminating the largest matched region in A or B from further examination when identifying additional matched regions.

8. An apparatus for identifying code similarities, comprising:

processing circuitry configured to execute instructions for determining matching between codes in the form of at least a first sample comprising a sequence of tokens A and a second sample comprising a sequence of tokens B, the instructions causing, when executed, for monotonically decreasing values of n, the processing circuitry to be configured to:
record a subset SA of n-grams of A in a hash table LA, such that a value of each n-gram determines an index in LA and a location of each respective n-gram in A is recorded as the value in LA;
hash n-grams of B;
determine whether to keep each hashed n-gram of B;
for each hashed n-gram being kept, determine a potential storage location L in a table;
instead of storing in the table, determine whether potential storage location L is occupied in LA; and
if occupied, determine whether a match exists, wherein being configured to determine whether a match exists includes being configured to examine a region in A centered on LA(L) and a region in B centered on LB(L) successively in stages with the region in A centered on LA(L) and the region in B centered on LB(L) being reduced in size in each successive stage until a largest matching region aligning LA(L) with LB(L) in A or B is found.

9. The apparatus of claim 8, wherein the processing circuitry is further configured for specializing monotonically decreasing values of n to exponential decay.

10. A method for identifying code similarities utilizing processing circuitry by determining matching between codes in the form of at least a first sample comprising a sequence of tokens A and a second sample comprising a sequence of tokens B, the method comprising, for monotonically decreasing values of n, performing operations including:

(a) defining independent n-gram hash functions g and h;

(b) recording, by the processing circuitry, a subset SA of n-grams of A in a first hash table LA, such that the value of the hash function g of each n-gram determines an index in LA and a location of each respective n-gram in A is recorded as the value in LA;

(c) recording, by the processing circuitry, a subset SB of n-grams of B in a second hash table LB, such that the value the hash function g of each n-gram determines an index in LB and a location of each respective n-gram in B is recorded as the value in LB;

(d) for each location L that is occupied in both LA and LB, comparing, by the processing circuitry, the hash function h of the n-gram in A at location LA and the hash function h of the n-gram in B at Location LB for equality;

(e) for each such equality, examining, by the processing circuitry, a region in A centered on LA(L) and a region in B centered on LB(L) successively in stages with the region in A centered on LA(L) and the region in B centered on LB(L) being reduced in size in each successive stage until a largest matching region aligning LA(L) with LB(L) in A or B is found or a size of the regions is reduced beyond a minimum size; and (f) reporting, by the processing circuitry, the largest matching region and marking the largest matching region as matched or reporting that the minimum size has been reached.

11. The method of claim 10, further comprising specializing monotonically decreasing values of n to exponential decay.

12. The method of claim 10, wherein the subsets of SA and SB are determined by hash values of g of n-grams meeting a defined criterion.

13. The method of claim 12, wherein n-grams already matched or infeasible are skipped.

14. The method of claim 10, wherein the minimum match size is specified by an operator.

* * * * *